Figure 1:
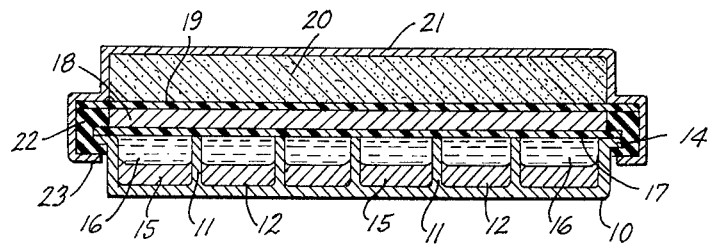

Feb. 22, 1966   J. M. BOOE ETAL   3,236,690
RECHARGEABLE ALKALINE CELL AND LIQUID PHASE-CONTAINING
AMALGAM ANODE THEREFOR
Filed Jan. 16, 1963

INVENTORS
JAMES M. BOOE
ROBERT E. RALSTON
BY
*Scholar James*
ATTORNEY

United States Patent Office 3,236,690
Patented Feb. 22, 1966

3,236,690
RECHARGEABLE ALKALINE CELL AND LIQUID PHASE-CONTAINING AMALGAM ANODE THEREFOR
James M. Booe and Robert E. Ralston, Indianapolis, Ind., assignors to P. R. Mallory & Co., Inc., Indianapolis, Ind., a corporation of Delaware
Filed Jan. 16, 1963, Ser. No. 251,823
10 Claims. (Cl. 136—68)

This invention relates to rechargeable alkaline cells and, more particularly, to a rechargeable cell incorporating an amalgam anode containing a liquid phase.

Heretofore, considerable difficulties were experienced with rechargeable alkaline cells in which the anode metal was oxidized during discharging and such oxide was reduced to the elementary metal during charging the cell. While cells of the described character performed very satisfactorily during the initial cycles of charging and discharging, their capacity would gradually decrease with each successive cycle or the cell would become completely inoperative generally as the result of internal short circuits between the anode and the cathode. This difficulty was particularly experienced with rechargeable cells comprising a zinc anode, an oxygen-yielding cathode, such as HgO, CuO, AgO, Ag$_2$O, or MnO$_2$, and an alkaline electrolyte, such as one of potassium hydroxide containing dissolved ZnO as potassium zincate. Upon repeated charging and discharging of such cells, the anode would eventually grow to a physically abnormal condition leading to malfunctioning generally by short circuiting by dendritic growths reaching from the anode to the cathode.

The phenomenon of dendritic anode growth is apparently caused by a secondary anode reaction during the charging cycle. The primary reaction consists in the reduction of the undissolved ZnO to Zn in the form of a zinc sponge whereas the said secondary reaction consists in the electrodeposition of additional zinc from the electrolyte onto the said zinc sponge, thereby to re-establish the anode. It is believed that this electrodeposition process taking place on an irregularly shaped zinc base or sponge is conducive to the formation of long dendrites of zinc metal. Each charge and discharge results in further growth of these dendrites which are known to grow through any porous barrier member or layer and eventually reach the cathode to cause a short circuit. This difficulty, for which so far no simple and completely satisfactory solution was found, was particularly serious in connection with practical applications of sealed rechargeable cells where it was necessary or desirable to charge and discharge the cell many hundreds or even thousands of times without any appreciable loss in capacity, or catastrophic failure due to internal short circuits.

It is an object of the present invention to improve electric current producing cells.

It is another object of the present invention to provide a rechargeable cell of novel and improved character capable of being cycled many thousands of times without losing any appreciable part of its capacity.

It is a further object of the invention to provide a rechargeable cell, specifically one employing a zinc anode and an alkaline electrolyte containing significant amounts of alkali metal zincate, from which dendritic structures of the zinc anode are notably absent.

It is also within the contemplation of the invention to provide a rechargeable cell having a liquid phase-containing anode and a novel terminal structure adapted to be used in combination with such anode.

The invention also contemplates a rechargeable cell capable of "deep" discharge and of being cycled many thousands of times, which is simple in structure, efficient in operation and which may be readily manufactured and sold on a practical and commercial scale at a lost cost.

Figure 2:
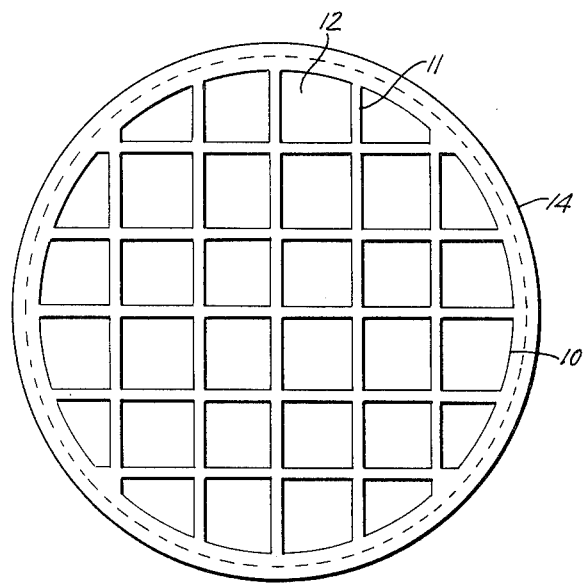

Other and further objects and advantages of the invention will become apparent from the following description, taken in conjunction with the accompanying drawing, in which:

FIG. 1 is a vertical sectional view of a rechargeable cell constituting a preferred embodiment of the invention; and FIG. 2 is a top elevational view of the anode container or current collector shown in FIG. 1.

Broadly stated, in accordance with the present invention, the above-mentioned difficulty experienced with rechargeable cells of the described character is overcome by maintaining the anode in a physical condition which is not conducive to the formation of dendrites during the electrodeposition of zinc from the electrolyte. This is accomplished by admixing an excess of mercury with the zinc anode, sufficient to maintain a liquid phase in the anode at all times. It has been found that a Zn-Hg anode works satisfactorily during discharge even when there is a large excess of mercury present. According to the Zn-Hg phase diagram published in the literature, to insure the presence of a liquid phase in the anode at all times, there should be present at least 60% by weight of mercury, when the cell is fully charged. (See, for example, "The Metals Handbook," published by the American Society for Metals, "Constitution of Binary Alloys" by Hansen, and other textbooks.) These sources agree that zinc is soluble in mercury to the extent of about 0.75% at 0° C., about 2% at 25° C., and about 3.5% by weight at 50° C. yielding an all liquid condition. When more zinc is added to the mercury in the range of normal temperature, i.e., 20° C. to 43° C., a liquid phase will be present until the metals are in a weight ratio of about 50–50. As the mercury content is increased from this value upward, the liquid phase portion increases, providing structures ranging from a weak solid metallic composition containing 60% mercury through compositions of increasing plasticity to a composition containing about 98% mercury which is mostly liquid mercury with some solid mercury-zinc compounds. Beyond 98% by weight of mercury, the composition is all liquid at room temperature. As an example, the 60% mercury-40% zinc composition has a slight metallic ring of a conventional metal, whereas the composition of 75% mercury-25% zinc composition is very soft and structurally weak with free liquid mercury being visibly present.

In the operation of the anode of the invention, upon discharge, ZnO will be formed at the surface of the amalgam and some Zn will be dissolved in the electrolyte as potassium zincate. Upon charging, the ZnO will be reduced to Zn, which will amalgamate with the mercury. Likewise, especially in later stages of charging, any zinc electroplated from the electrolyte onto the liquid phase of the anode will also be amalgamated therewith thus precluding the possibility of solid zinc dendrite growths.

As stated in the foregoing, the lower limit of Hg in the anode of the invention is 60% by weight in the charged condition of the cell. As to the upper limit of mercury, this is not particularly critical. Experimental work carried out with cells of the invention has surprisingly demonstrated that an initial mercury content as high as 98% by weight is not only entirely satisfactory but in many cases provides results superior to those obtained with anodes considerably lower in mercury content.

Generally speaking, the practical range of the anode compositions of the invention is from about 60% to about 98% by weight of mercury, balance zinc, and the preferred range is from about 75% to about 95% by weight of mercury, in the charged condition of the cell. Selection of the particular mercury-zinc composition for the anode will depend somewhat on the service to which a battery of this type will be subjected. When the cell is intended for low charge and discharge rates, it is desirable to select the composition having the lowest mercury content, in order to reduce weight and space requirements. For such applications, a composition containing only 60% mercury may be entirely satisfactory. Although quite low, the amount of liquid phase in the amalgam at the end of charge is adequate to prevent dendritic growth on the anode. Where, on the other hand, a high charge and discharge rate is required and the duty cycle is relatively short, as is the case of batteries operating in an earth orbiting satellite service, it is preferred to employ a much higher mercury content in the anode, such as 80% to 95% by weight. In either case, the anode will be completely liquid at the end of a complete discharge operation due to the fact that only the mercury remains therein.

The mechanism whereby dendritic growth is prevented during the charging operation is based on the fact that as the zinc is either reduced from its oxide or electrodeposited from the electrolyte, it will be surrounded with and amalgamated by the mercury-zinc liquid phase in the anode structure. This eliminates any sharp points or projections on which dendritic deposits would grow and eventually would reach the cathode to cause a short circuit.

The invention is applicable to various cell systems, the principal examples of which are $Zn-KOH-HgO$;

$$Zn-KOH-CuO$$

$Zn-KOH-AgO$, $Zn-KOH-Ag_2O$ and $Zn-KOH-MnO_2$. Of course, other alkaline electrolytes may be used, such as aqueous solutions of NaOH and LiOH, which preferably may contain dissolved ZnO in the form of alkali metal zincate to reduce the open circuit reactivity of the anode with the electrolyte to a negligible value. In the $Zn-KOH-HgO$ system, it is desirable to incorporate a quantity of silver powder with the HgO, in order to improve the electrical conductivity of the cathode-depolarizer and to amalgamate with the mercury reduced from the HgO, as this is fully disclosed and claimed in Ruben Patent 2,554,504. In the $Zn-KOH-CuO$ and $$Zn-KOH-MnO_2$$

systems, a minor percentage of micronized graphite, or of some other inert material of higher conductivity is admixed with the CuO or $MnO_2$ in order to compensate for the relatively high specific resistivity of the depolarizer. In general, no addition agent is required for the AgO or $Ag_2O$ depolarizers due to the relatively good electrical conductivity of these materials.

In view of the liquid phase-containing character of the amalgam anodes of the invention, certain structural features have to be incorporated in the cells embodying the same to enable proper functioning of the anode both during charge and discharge. The most important ones of these structural requirements may be listed as follows:

(a) The amalgam anode containing a liquid phase must be prevented from flowing or migrating away from the anode cell terminal.

(b) The amalgam anode containing a liquid phase must be prevented from flowing to the cathode depolarizer, which would effectively short circuit the cell.

(c) Preferably, provision should be made to retain the anode corrosion products at or near the surface of the anode.

(d) Sufficient space must be provided to accommodate expansion of the amalgam anode during discharge due to the formation of ZnO.

(e) The cell must be so constructed and arranged as to assure contact of the electrolyte with the amalgam anode and its corrosion products at all times.

As the anode of the invention is either partly or wholly in the liquid phase, there is the problem of containing this liquid metallic member in a proper and useful physical condition. Also, as such member is subject to displacement in the cell by the agencies of gravity and shock, some means must be employed to retain the member so that it will remain substantially uniformly distributed over the surface of the current collector or cell container retaining this anode. According to another important aspect of the invention, this is achieved by the following expedients:

(a) The current collector or anode container is made of a metal which is wetted by the liquid phase of the anode and is electro-chemically compatible with the anode metal and with the electrolyte. Such metals as silver, copper and gold, and certain of their alloys appear to be the best for this use and may be employed as solid metals or as coatings on other compatible materials.

(b) The anode container is preferably so constructed as to have a cellular form, the individual cells, or compartments, not being interconnected but being open at their top to permit access of the electrolyte to the bodies of liquid phase-containing anode confined in each cell.

In an anode container of the described character, the liquid phase-containing anode metal amalgam must wet the walls of the cells which greatly assists in retaining the amalgam in place. If required in greater quantity, the amalgam may fill the cells to some depth. In this case, the liquid metal amalgam is preferably retained in the cells by means of a porous or semi-permeable membrane held over the cells with sufficient pressure to prevent the amalgam and electrolyte from flowing from one cell to another over the partition walls defining the cells. The depth of the cells has to be sufficient to permit the presence of an adequate quantity of electrolyte and to accommodate the accumulated anode metal corrosion products upon cell discharge.

Referring now more particularly to the drawing, reference numeral 10 denotes a current collector or anode container integrally formed of silver with a number of intersecting partition walls 11, defining a plurality of individual cells 12. It will be noted that the cells are open at their top but are otherwise completely disconnected from each other. Anode container 10 is provided with a peripheral flange 14, the object of which will appear presently. A body 15 of Zn-Hg amalgam containing a liquid phase is confined in each cell, the remainder of the space in such cell being filled out by an alkaline electrolyte 16 which may be composed of an aqueous solution of 40% by weight of KOH containing about 6.25% by weight of dissolved ZnO. An anode barrier layer 17 is pressed against the top surface of anode container 10 and has the function of confining the liquid anode material and electrolyte present in each cell while preventing displacement of such anode and electrolyte from one cell to another. Barrier layer 17 may be formed of a suitable semi-permeable material, such as regenerated cellulose.

A layer 18 of fibrous electrolyte-absorbent material, such as alkali-resistant paper, is superposed on top of anode barrier layer 17 and is covered with a second, or cathode barrier layer 19, which may be formed of a microporous material resistant to the oxidizing effect of the depolarizer.

Cathode depolarizer 20, which may be composed of mercuric oxide having 10% to 30% by weight of silver powder admixed therewith, is compressed in a cathode container 21 of steel, at least the inner surface of which is silver plated. An insulative sealing grommet 22 formed of a suitable elastomer, such as polyethylene, is compressed between flange 14 of anode container 10 and the crimped or spun over marginal portion 23 of the cathode container 21 defining therewith a sealed enclosure for the cell. In assembling the cell, sufficient pressure is applied to maintain the several layers in good contact and to have anode cells 12 sealed off from each other by means of superposed barrier layer 17.

Actual charge and discharge experiments with the cell of the invention indicate that, during the charge part of the cycle, the metallic zinc deposited on the liquid anode by reduction of the zinc oxide and by electrodeposition from zinc ions in the electrolyte will substantially dissolve in the mercury thus precluding the formation of zinc dendrites. As a further and unexpected result of these experiments, it was found that in spite of the diluting effect of mercury on the zinc, the permissible discharge rate of the anode increased many times over that of pure solid zinc. In fact, at very low starting concentrations, such as 10% by weight of zinc, or less (balance mercury), an extremely high discharge rate was experienced with virtually all the zinc being used up at such rate as to sustain the voltage and current to the end when the concentration of zinc in the mercury would be only a few hundredths of a percent.

These results, as obtained with experimental cells, are given in the following table. In all cases, the amount of zinc added to the mercury was .1 gram, which is equivalent to 82 milliampere hours. These tests were made with an excess of HgO depolarizer to ensure that any polarization will be at the negative electrode.

Table.—Negative electrode rate and utilization determinations-(high mercury-zinc compositions vs. solid pure zinc)

| Anode Composition | Current Density (ma./sq.in.) | Time (Minutes) | Capacity, ma.-hrs. | Utilization (Percent) |
| --- | --- | --- | --- | --- |
| Solid Zinc | 213 | 34.2 | 3.5 | 34.3 |
| Do | 300 | 17.5 | 2.6 | 24.4 |
| Do | 450 | 7.4 | 1.7 | 15.8 |
| Do | 600 | 4.8 | 1.5 | 13.6 |
| 25 Zn—75 Hg | 600 | 24 | 56 | 68.3 |
| 10 Zn—90 Hg | 600 | 34.7 | 81 | 99 |
| 10 Zn—90 Hg | 1,000 | 19.92 | 81.3 | 99.1 |
| 5 Zn—95 Hg | 600 | 34.75 | 81.2 | 99.1 |
| 2 Zn—98 Hg | 600 | 34.5 | 80.5 | 98.3 |

The cellular anode container of the invention may be made by various metallurgical procedures including casting, stamping, pressing from metal powder followed by sintering, and the like. One practical method comprised pressing a slug of the metal in the heated condition with a cross slotted tool to extrude the metal into the slots. Upon separation of the pressed slug from the tool, the desired cellular construction is obtained. When the anode container, or retainer, is made of silver, pressing at such elevated temperatures as 400°–600° C., where the metal is very soft, provides excellent results.

Although the present invention has been disclosed in connection with preferred embodiments thereof, variations and modifications may be resorted to by those skilled in the art without departing from the invention. Thus, oxygen-yielding depolarizers other than HgO, CuO, AgO, $Ag_2O$, or $MnO_2$ may be used. While the preferred electrolyte is an aqueous solution of KOH in which has been dissolved between 20% and 45% by weight of KOH and also containing between 1% and 8% by weight of dissolved ZnO in the form of potassium zincate, other concentrations of KOH or of other alkali metal hydroxides may be used. All of these variations and modifications are considered to be within the true spirit and scope of the present invention, as disclosed in the foregoing description and defined by the appended claims.

What is claimed is:

1. In a rechargeable alkaline cell an anode in combination therewith which comprises a zinc-mercury amalgam containing at least 60% by weight of mercury in the fully charged condition thereby to maintain at least a portion of said amalgam at all times in the liquid phase, said liquid phase being constituted by zinc dissolved in mercury.

2. In a rechargeable alkaline cell an anode in combination therewith which comprises a zinc-mercury amalgam containing at least 60% by weight of mercury in the fully charged condition of the cell and having at least a portion thereof in the liquid phase, said liquid phase being constituted by zinc dissolved in mercury, a cellular container for said amalgam comprising a multiplicity of disconnected compartments open at one of their ends and closed at their other end, said container being formed of a metal which is wetted by said amalgam and has a low electrochemical potential with respect to zinc in an alkaline electrolyte, and a microporous barrier layer permeable to the electrolyte sealing the open ends of said compartments to retain the said amalgam therein.

3. A rechargeable cell comprising, in combination, a zinc-mercury amalgam anode containing a liquid phase composed of zinc dissolved in mercury, a depolarizer cathode, and an alkaline electrolyte interposed between and in contact with said anode and said cathode, the minimum amount of mercury present in the anode being about 60% by weight and the maximum amount of mercury present in the anode being about 98% by weight in the fully charged condition of the cell.

4. A rechargeable cell comprising, in combination, a zinc-mercury amalgam anode containing a liquid phase composed of zinc dissolved in mercury, a depolarizer cathode, and an alkaline electrolyte interposed between and in contact with said anode and said cathode, the amount of mercury present in the anode being between about 75% and about 95% by weight in the fully charged condition of the cell.

5. A rechargeable cell according to claim 3 wherein the cathode comprises an oxygen-yielding depolarizer selected from the group consisting of HgO, CuO, AgO, $Ag_2O$ and $MnO_2$.

6. A rechargeable cell comprising, in combination, a cathode container having an oxygen-yielding depolarizer compressed therein, an anode container having therein an amalgam anode composed of zinc and at least 60% by weight of mercury, said anode containing a liquid phase constituted by zinc dissolved in mercury, an insulative sealing grommet compressed between cooperating marginal regions of said containers and defining therewith a sealed enclosure for the cell, at least one semipermeable barrier layer interposed between said cathode and said anode confining the anode in its container, and an alkaline electrolyte cooperating with said cathode and said anode, said anode container being made of a metal which is wetted by said amalgam and is electrochemically compatible with zinc.

7. A rechargeable cell comprising, in combination, a cathode container, an anode container formed with a plurality of compartments open at one end and closed at the other end, a body of zinc-mercury amalgam anode in each of said compartments composed of zinc and at least 60% by weight of mercury and containing a liquid phase constituted by zinc dissolved in mercury, said anode container being made of a metal which is wetted by said amalgam and is electrochemically compatible with zinc, a microporous barrier layer superimposed upon said compartments and substantially preventing intercommunication therebetween, means including a compressed insulative sealing member defining with the containers a sealed enclosure for the cell, and an alkaline electrolyte in contact with said cathode and with said liquid phase-containing amalgam anode through said barrier layer.

8. A rechargeable cell according to claim 7 wherein at least the inner surface of the anode container is made of metal selected from the group consisting of silver, copper, gold and alloys thereof.

9. A rechargeable cell comprising, in combination, an open-ended cathode container, a cathode depolarizer composed of a mixture of mercuric oxide and silver powder compressed in said container, an open-ended anode container formed of silver with a plurality of open-ended disconnected compartments faced into said cathode container, a body of a zinc-mercury amalgam in each of said compartments composed of zinc and at least 60% by weight of mercury in the fully charged condition of the cell and containing a liquid phase, said liquid phase being constituted by zinc dissolved in mercury, a microporous barrier layer superimposed upon said compartments and substantially preventing intercommunication therebetween, an insulative sealing member compressed between cooperating marginal regions of said cathode and anode containers and defining therewith a sealed enclosure for the cell, and an electrolyte of potassium hydroxide containing significant amounts of potassium zincate in contact with said cathode and with said bodies of liquid phase-containing zinc-mercury amalgam anode through said barrier layer.

10. A rechargeable cell according to claim 9 wherein the amount of silver powder admixed with the mercuric oxide depolarizer is between 10% and 30% by weight.

References Cited by the Examiner

UNITED STATES PATENTS

| 2,422,045 | 6/1947 | Ruben | 136—107 |
| 2,554,504 | 5/1951 | Ruben | 136—7 |
| 2,620,368 | 12/1952 | Ruben | 136—107 |

WINSTON A. DOUGLAS, *Primary Examiner.*

MURRAY TILLMAN, *Examiner.*

B. J. OHLENDORF, *Assistant Examiner.*